Patented Apr. 1, 1941

2,237,222

UNITED STATES PATENT OFFICE 2,237,222

APPLICATION OF CELLULOSE DERIVATIVES

Vincent Jerome Flynn, Brooklyn, N. Y., assignor to Wardlyn Corporation, Union City, N. J., a corporation of New Jersey No Drawing. Application September 29, 1938, Serial No. 232,410

7 Claims. (Cl. 128—349)

This invention relates to compositions of tubes of varying size, shape and length partially or wholly composed of organic derivatives of cellulose, or pieces of cellulose derivatives, either solid or hollow, or circular, oval, elliptical, square, rectangular or of other cross-sectional shape, and in general, to surgical devices comprehended under the terms exploratory and evacuative, as catheters, sounds or cannulae, being when solid, intended for distending a passage, and when hollow for insertion into a normal opening of the body for injection or withdrawal of fluids therein or therefrom and for medicamentation, or for insertion into an incision as in post-operative work, for drainage and other purposes.

By the term "catheter" as herein applied, is to be understood as comprehending the various sizes, shapes and lengths of (usually) hollow construction for introduction of a substance into the body through an opening or the withdrawal of fluids therefrom, and referred to under terms such as antrum, colonic, elbowed, double-elbowed, curved Eustachian, faucial, female, indwelling, prostatic, or winged catheters, tubes, irrigators, and by other names.

Heretofore, catheters have been made of various materials showing a degree of flexibility, as thin metal tubing, rubber of varying stages of vulcanization, and compounds in the liquid or semi-liquid condition built up over a web as of a fabric, usually by repeated dipping of the same in a solution of the coating or impregnating material.

Metal catheters are harsh to delicate membranes, prone to irritate and wound tissues upon insertion, especially when the tissues are ultra-sensitive and unusually delicate, as in inflammatory and certain pathological processes and normal and pathologic secretions exert a solvent effect on the metal which with some metals is very marked. Their comparatively low elasticity is also a disadvantage to their extensive application, especially in urological work as urethral, ureteral and renal exploration and in connection with the removal of some forms of renal calculi.

Catheters made of rubber vary greatly in elasticity and suppleness dependent upon the degree of vulcanization to which the rubber has been subjected. The "soft" rubber catheters are highly elastic, but more or less porous and spongy, causing difficulty in sterilization, and requiring such rigid sterilization treatments as to materially shorten their period of effectiveness. They also, in general, lack the requisite rigidity coupled with the desired flexibility to penetrate body canals, especially the ureter where the canal diameter is relatively small and more or less tortuous, and which may be constricted or even substantially closed by means of abnormal or other conditions present therein.

The "hard" rubber catheters while they may be of the desired rigidity, are deficient in suppleness and pliability. The comparatively large amounts of sulfur and sulfur compounds contained therein, together with the vulcanization accelerators, many of which are nitrogen compounds of pronounced toxicity, materially militate against their effectiveness and narrow their range of safe applicability. Furthermore, hard rubber catheters are prone to injure and wound delicate membranes which are often extremely tender and susceptible due to irritations and inflammatory conditions so that the use of these catheters is materially limited, both as to scope of application and to the technique and experience of the manipulator. Catheters are often used by the layman, sometimes daily, as in prostatic enlargement and analogous complications, and the unyielding property of vulcanized rubber often initiates irritation, which, when continued, may and does lead to serious chronic results.

Glass catheters, while usually of smooth surface, have a very low elasticity and suppleness, and there is alway present the grave danger of breakage or chipping off especially where the glass wall is of relatively extreme thinness, as is sometimes the case. For this and other reasons, the use of glass catheters involves an element of danger, and in addition they have a limited and decreasing range of applicability.

Enamel catheters, that is, catheters made of glazed porcelain, are used to a limited extent. They are practically rigid with zero flexibility, of relatively rough interior due to the difficulties of interior glazing, and very fragile in the thin cell wall diameter as usually prepared. By virtue of this inherent rigidity enamel catheters are useless for adaptation to the varying contour of the canal into which they are intended to be inserted, and the rough interior introduces the danger of incomplete sterilization.

One of the objects of my invention is to overcome and minimize the herein enumerated and other disadvantages, while still conserving the points of desirability of these instruments as a class, as applied to the various uses for which they are normally intended, and I have found that most of the inherent objections are overcome where the catheter material is composed of a cellulose ester of mixed acid radical, especially where the degree of esterification approaches the maximum.

For many purposes and depending upon the physical properties desired in the finished catheter, and its size, dimensions, wall thickness, etc., the desired elasticity, suppleness, flexibility, stability, and freedom from objectionable features for the purposes for which it is intended, I may use a mixed cellulose ester or mixture of cellulose esters of dissimilar acid radical, and where additional suppleness, elasticity, etc., is desired, suitable plasticizers, flexilizers, softeners, extensifiers or suppleness-inducing components may be incorporated with the cellulose ester in amount and of nature to impart the kind and degree of characteristics desired. The highly esterified mixed ester celluloses have been found especially useful in this connection, an account of the number and amount of suitable plastifying components which may be harmoniously incorporated therewith to induce the specific properties required and the extent of the same desired.

The mixed cellulose esters, as a class, are insoluble in, and not detrimentally affected by ptyalin, pepsin, trypsin, oleopsin, steapsin, and other body enzymes and fluids, the products elaborated in the gall bladder, liver and kidney, both those that are normal to the healthy body and those formed under pathological conditions; they can be produced of a high degree of flexibility, and are not adversely affected by the usual antiseptics, disinfectants, bactericides, both those of metallic and non-metallic origin, usually applied for sterilization purposes.

As is well known, many of the normal or pathological body secretions either are distinctly acid in reaction as the hydrochloric acid in the gastric juice, the bile acids, uric acid and the like, while other secretions are of pronounced alkaline reaction. These chemically reactive bodies often aided by enzymic action, exert an appreciable dissolving and decomposing effect upon a catheter or instrument of analogous use, when made of rubber or of a cellulose ester, especially where in some instances, the tubular surgical device is left in the body for an extended period as often is the case in drainage treatments. With the simple cellulose esters, as the nitrate or the acetate, a saponifying action results, whereby a decomposition of the cellulose ester takes place by a splitting off of acid radical As the culmination of a series of quantitative researches, the surprising and unobvious observation has been made, that mixed cellulose esters, and specifically the mixed esters of comparatively high degree of esterification, differ fundamentally from the simple cellulose esters as cellulose acetate, in that they are considerably more insoluble in and unaffected by chemical and other components elaborated by or in the human body in health and disease.

This has been found to hold true to the maximum degree when acetic acid is one of the ester rests, and an acid of higher molecular weight than acetic acid is the other, and where the esterification has been allowed to proceed to commercially maximum degree, that is to say, where esterification of the cellulose has resulted in the introduction of acetyl rests with another acid rest to the extent of 75% to 95% of that theoretically possible, with the production of a cellulose ester substantially insoluble in water. The word "maximum" as herein used in connection with the mixed acid esterification of cellulose or other carbohydrate, varies considerably in commercial processes, depending upon the nature of the esterifying process and the efficiency of the particular apparatus employed in the esterifying steps.

Satisfactory results have been obtained by me in this connection where the acetic acid compound of cellulose contains another acid rest as propionic, butyric or nitric, resulting in the formation of an acetonitrate, acetopropionate or acetobutyrate of cellulose.

I prefer to use a mixed ester wherein the dissimilar acid radicals combined with cellulose are members of the aliphatic series of organic acids, and wherein acetic acid is one of the acids in combination. It has been found that where the acids rests in this series are of greater molecular weight than butyric acid, solubility characteristics are lowered, especially in organic volatile solvents and certain thermoplasticizers, and therefore insofar as this invention is concerned best results have been obtained by me wherein the acetic acid is combined with either propionic or butyric acids to form a mixed cellulose acetopropionate or acetobutyrate. These mixed esters as prepared for commercial uses are esterified for use primarily in lacquer, varnish, enamel and bronzing liquid industry, where solubility in organic volatile solvents is the prime consideration.

I have found that such mixed esters seldom reach as high as 75% total combined acid rests, and where the esterification is carried out to a maximum of (say) up to 90% total acid combined with cellulose, solubility in normal and pathological body secretions is practically nil, and there is no observable swelling of the catheter or other similar instrument when left in contact with such fluids for a considerable number of days, as is necessary often in drainage operation.

Therefore the scope of this invention is limited to a cellulose aceto-propionate or acetobutyrate, in which substantially a maximum degree of esterification has been attained. I have found especially satisfactory results are obtained where the combined esterification is 90% of the theoretical or greater.

It is impossible to increase the elasticity of rubber at will by the addition of products thereto, whereas with the mixed radical cellulose esters by selection of the appropriate plastifying agent or combination of the same, and the ratio between plastifier and mixed cellulose ester, there is a very wide range of flexibility and elasticity possible, which peculiarly adapts the mixed cellulose esters for use in the catheter industry. Phenols, iodides and other halogen inorganic or organic compounds of normal bactericidal concentration are inert in unfavorable action to the cellulose esters of degree of esterification comprehended herein.

The antiseptic, local anesthetic, fungicide, bactericide, medicament, or other addition of therapeutic value to the catheter substance may be incorporated therewith in any approved manner, such, for instance, as dissolving the same in a relatively small amount of harmonious solvent or solvent combination, incorporating the same with the esterified cellulose in any approved manner as by malaxation, then preferably removing the volatile portion by an evaporative step before extrusion, so that the medicament is uniformly disseminated throughout the esterified cellulose mass.

The esterified celluloses containing dissimilar acid radicals, as a class are peculiarly adapted for use in this connection by virtue of the fact that they may be extruded in practically non-porous condition, may be dyed, pigmented, or otherwise treated without detrimentally affecting their normal stability or usefulness; and the elasticity, being inherent in the cellulose ester body, persists unchanged for an indefinite period of time. Therefore, a widely varying degree of desirable properties may be obtained, especially as to elasticity, plasticity, suppleness and flexibility of the ester, and these inherent desirable properties may be considerably augmented by the addition to the cellulose ester of suitable plasticizing bodies now known to this art, such as aliphatic and carbocyclic esters of acetic, propionic, butyric, lactic, glycollic, tartaric, oxalic, malic, succinic, phthalic and other acids, aryl phosphates, cyclohexanol esters, synthetic resinous bodies as the halogenated diphenyls, the substituted sulfonamides, and the like.

A catheter, in general, may be considered as a tube, straight, curved, elbowed, etc., depending upon the use for which it is normally intended, and usually comprises an outer end or end held by the operator, which may be of the same exterior diameter as the remainder of the tube portion or may be flared or otherwise enlarged; the opposite end called the tip or beak, being that end intended for insertion, and which may be of the same diameter as the tube portion, or may be smaller, and is usually made in many shapes and in a variety of ways. The tip may be a portion of the original tube with one or more orifices therein, or it may be a separate piece immovably attached to the body of the catheter tube by means of an agglutinant, by fusion, or in any other manner. The shape, configuration, length, and number of orifices therein, may vary considerably, depending upon the specific use to which the instrument is to be applied.

Having determined the degree of ester properties intended from the desired use for which the instrument is designed, the kind and nature of mixed cellulose ester is selected, the amount and kind of thermoplasticizing body added if any be used, and the composition by means of solvents, non-solvents and solvent and non-solvent combinations, gelatinized or colloided to the degree required, then extruded through an orifice of appropriate size and shape, into tubular or other form.

In general, it has been found that the melting point is raised and the deleterious action of water on the mixed cellulose ester decreases with the number of similar or dissimilar acid radicals in the esterified cellulose and with increase in molecular weight of the non-acetic acid radical. For the above and other reasons, I have obtained most satisfactory results herein by employing a mixed cellulose ester or cellulose esters approaching substantially as nearly as commercially feasible, the maximum in esterification.

The exterior surface of the material may be modified as by smoothing, dipping in a cellulose ester, cellulose ether, or other lacquer or coating composition, to increase the hardness, lessen the degree of permeability or for other reasons, after which the tube portion is expanded or the diameter otherwise modified at the outer end, and the tip or beak portion may be punched, drilled, or otherwise one or more orifices placed therein after closing the beak end, as with a cellulose ether composition, or a separate tip may be made and coapted onto the tube portion by means of an adhesive, by heat, by heat and pressure, or in any other way, said tip being of the size and nature required for the specific purpose intended. The number, size, spacing and location of orifices in the beak portion may be modified at will.

The mixed cellulose ester composition such as acetonitrate, acetopropionate or the like, may be colored with dye or pigment or both, to render the instrument distinctive upon observation; it may be printed or lithographed upon, either under or on the final exterior coat if the extruded member is subjected to a dipping process after extrusion, or various antiseptics, remedial agents, analgesics or local anesthetics may be incorporated in the mixed cellulose ester plastic mass to induce a therapeutic effect on the organs with which the catheter may normally be brought into contact. Urethral and especially ureteral catheter explorations are usually relatively painful operations, so that the incorporation within the catheter mass of local anesthetics, analgesics and the like, is often indicated.

Before extrusion into tubular form, and especially where the instrument is intended primarily for urological work as with urethral and ureteral catheters, the mixed cellulose ester may have incorporated therewith and therein, varying the proportions of opacity inducing bodies of value in X-ray work, such as bismuth salts (the normal nitrate or subnitrate), lead sulfates and lead salts, barium salts such as barium sulfate or barium titanate and other salts or mixtures of salts suitable for this purpose. As an example, given for illustrative purposes only, I have found an excellent composition for this purpose to be composed of 1 part cellulose ester plastic mass to about 1 to 2 parts lead sulfate, although these proportions may be varied, from the amounts above stated, depending upon the cellulose ester composition, the dimensions and thickness of the catheter tube, the nature of the opacity-inducing body used, and the particular roentgenological diagnosis to be made.

Urethral catheters are usually flared on the outer end, substantially round, of exterior diameter 0.06 to 0.25 inch, interior diameter sufficiently large usually to admit a ureteral catheter. Ureteral catheters are usually not flared on the outer end, and vary in tube diameter from 0.04 to 0.10 inch external and about 0.015 inch internal diameters. For colonic work, a round tip is usually used, the exterior diameter being up to 0.75 inch diameter. An antrum catheter usually has an exterior diameter range of 0.075 to 0.15 inch and a varying internal diameter. The exterior and interior diameters will, of course, be adjusted by the extrusion operation, taking into the consideration the amount, if any, of volatile solvent present and the relative volatility of the plasticizing portion added to the mixed cellulose ester prior to the extrusion operation. The shape of the catheter tip may vary considerably, as in the olive, round or whistle tips, as examples.

In general, the substantially maximum esterified celluloses of dissimilar acid radicals have a higher inherent thermoplasticity than the simple cellulose esters, which property may be considerably augmented and varied in degree by the incorporation therewith of suitable known cellulose ester plasticizers and flexibility-inducing compounds, and still conserve the relatively high and permanent stability to, and insolubility in chemical reagents which characterize the mixed cellulose esters in general.

Likewise, it has been found that by the use of certain cellulose ester plasticizing and thermoplasticizing agents, the stability of the esterified cellulose may be augmented, the porosity diminished, and the suppleness and flexibility materially increased, without concomitantly decreasing otherwise valuable inherent characteristics.

There has been described a method of producing a catheter by first forming a textile core, dipping the core into a solution of cellulose- or other compound, drying the same, then repeating the process until there has been built up on the textile center or core a sufficient thickness of layers for the purposes intended. However, such constructed tubes are porous, they have pinholes and blisters therein which increase the natural porosity, as compared with the cellulose ether composition of the nature as herein set forth which has been compacted by the necessarily high pressure involved in the extrusion operation to a unitary non-porous whole, and is composed of a unitary material throughout its substance. With a fabric core catheter built up in manner as above indicated, there is tendency upon use for the textile core to become frayed, and a fragment may be broken off and remain in the bladder or kidney, thus providing a nucleus or nidus around which a calculus may form.

Therefore, the catheter involved in this invention is of homogeneous structure throughout, and there is no dissimilar material core which may break off, fray or cause an impediment in X-ray work or similar investigation, on account of variation of opacity.

At the close of the extrusion operation, the catheter may be dipped, sprayed, or otherwise coated with a soluble cellulose derivative in solution, and the instrument may be smoothed, polished, printed upon or otherwise treated to produce a finished appearing instrument. The printing operation may be conducted upon the extruded cellulose compound, either before or after the catheter is coated with a fluid compound, and either before or after the polishing or other finishing operation.

What I claim is:

1. A tubular surgical device comprising a neutral water-insoluble esterified cellulose containing dissimilar aliphatic acid radicals, of commercially maximum degree of esterification.

2. A tubular surgical device comprising a propionated acetylcellulose of maximum commercial degree of acetylation and propionation.

3. A tubular surgical device comprising cellulose combined with acetic acid and other aliphatic acid to form a dissimilar cellulose ester, of commercially substantially maximum degree of esterification.

4. A flexible, tubular surgical device of homogeneous structure, said device comprising a thermoplastic butylated acetylcellulose, of substantially maximum degree of acetylation and butylation.

5. A catheter comprising an acetylated cellulose butyrate of commercially maximum degree of acetylation and butylation.

6. A catheter comprising a mixed aliphatic cellulose ester in which the acid radicals are acetic acid with propionic or butyric acids, and in which the degree of combined esterification is not less than 75% of the theoretical.

7. A catheter comprising a relatively long, hollow tube of small external diameter formed by extrusion from a thermoplastic mass of a neutral water-insoluble esterified cellulose so as to be externally smooth, continuous, non-porous and highly flexible but having sufficient inherent tensile strength and longitudinal rigidity to permit insertion by itself into and through long, narrow and tortuous bodily passages, the degree of esterification of said cellulose being so high as to render said catheter water-insoluble and unaffected by moisture, substantially inert to bodily fluids and medicaments and to have the other inherent characteristics aforesaid.

VINCENT JEROME FLYNN.